United States Patent [19]

Stuckey, Jr. et al.

[11] 4,328,090

[45] May 4, 1982

[54] PROCESS FOR PRODUCTION OF HYDROGENATED HYDROCARBON POLYMERS AND CATALYST USEFUL THEREFORE

[75] Inventors: A. Nelson Stuckey, Jr., Baton Rouge, La.; John R. Shutt, Duesseldorf, Fed. Rep. of Germany

[73] Assignee: Exxon Research & Engineering Co., Florham Park, N.J.

[21] Appl. No.: 174,216

[22] Filed: Jul. 31, 1980

[51] Int. Cl.$^3$ .............................. C10C 1/20; C10C 3/02
[52] U.S. Cl. ...................................... 208/44; 252/465; 252/466 J
[58] Field of Search ........................................... 208/44

[56] References Cited

U.S. PATENT DOCUMENTS 3,755,139 8/1973 McClaren et al. .................... 208/44
4,163,707 8/1979 Goudriaan et al. ................... 208/44

FOREIGN PATENT DOCUMENTS 1202802 8/1970 United Kingdom ................. 208/44

Primary Examiner—Paul F. Shaver
Attorney, Agent, or Firm—Roland A. Dexter

[57] ABSTRACT

An improved method for making petroleum resins resulting from the thermal polymerization of a steam-cracked petroleum distillate fraction wherein the polymeric resin is subjected to catalytic hydrogenation/decolorization characterized in that the catalyst is sulfided nickel (2 to 10 wt. %)—tungsten (10 to 25 wt. %) disposed on a gamma alumina support to provide a fresh catalyst surface area ranging from 120 to 300 m$^2$/g.

10 Claims, No Drawings

PROCESS FOR PRODUCTION OF HYDROGENATED HYDROCARBON POLYMERS AND CATALYST USEFUL THEREFORE

BACKGROUND OF THE INVENTION

1. Field of the Invention

The present invention relates to a process for making light-colored petroleum resins from fractions of distillates derived from petroleum cuts that have undergone steam cracking, as well as resins displaying the above characteristics.

More particularly, this invention relates to hydrocarbon resin hydrogenations by a heterogeneous catalyst where high molecular weights lead to diffusion limitations as in the hydrogenation and decolorization of a hydrocarbon resin prepared by the thermal polymerization of cyclopentadiene and methylcyclopentadiene in the liquid phase or mixed phase.

2. Description of the Prior Art

It is known that from steam cracked petroleum distillate fractions, having boiling points within the range 20°/280° C., it is possible to prepare resins of medium to high softening point by thermal polymerization carried out at a temperature of, for preference between 160° and 320° C., at a pressure for preference between 10 and 30 atmospheres; the polymer obtained is distilled at a temperature between 220° and 350° C., with or without the injection of superheated steam.

Although the resins thus obtained have some interesting properties, they have the disadvantage of a rather dark color. These resins have the further disadvantage that they are thermally and oxidatively unstable, i.e., they are chemically reactive.

In United Kingdom Specification No. 1,202,802, the inventors teach that it is possible to obtain resins with a high softening point and pale color, by subjecting a resin obtained by thermal polymerization from steam cracked petroleum distillate fractions, preferably having a boiling point between 20° and 280° C., to catalytic hydrogenation, said fractions usually of compounds having one or more unsaturated cyclic rings in the molecule, such as cyclodienes, cycloalkenes, and indenes.

Suitable hydrogenation catalysts include nickel, reduced nickel, molybdenum sulphide, with a preferred catalyst being a pre-activated catalyst on a kieselguhr support containing about 58% by weight of nickel, the specific area being about 140 m$^2$/g and the ratio: reduced nickel to total nickel equal to about 0.66. Suitable proportions total nickel of catalyst are from 5 to 20% by weight, and for preference from 7 to 13% by weight, in relation to the resin.

Before carrying out hydrogenation, the thermally polymerized resin is preferably dissolved in a saturated hydrocarbon solvent such as heptane. Hydrogenation can take place in a single stage at a temperature of 200° to 260° C. and for preference from 210° to 230° C., at a pressure of 20 to 120 atmospheres, and for preference from 30 to 90 atmospheres for a period of 5 to 7 hours. After filtering off the catalyst, the solvent is removed by distillation and recovered for recycling.

In this way is obtained, with a yield generally in the order of 90-95% (in relation to the thermal resin treated), a hydrogenated resin characterized by a Gardner color in the region of 1 to 3, a softening point in the region of 150° to 180° C., and a bromine number in the region of 1 to 3.

In the production of these resins, the amount produced is limited particularly by the feed throughput and catalyst lifetime.

Accordingly, in view of the above, the need has existed for an improved process providing for increased yield of hydrocarbon resins of quality comparable or superior to that produced by the prior art processes and in addition, operating with catalysts and process conditions resulting in longer run lengths.

SUMMARY OF THIS INVENTION

It has now been discovered that increased yields of colorless hydrocarbon polymeric resin is possible when in the hydrogenation process, a solution of the thermal polymeric resin of principally cyclopentadiene and methylcyclopentadiene in a suitable hydrocarbon solvent, is passed with an excess of hydrogen or hydrogen rich gas over a catalyst when the catalyst is a sulfided Ni-W or Ni-Mo catalyst on an alumina support having a specific fresh surface area ranging from 120 to 300 m$^2$/g and containing from 2 to 10% by weight nickel and from 10 to 25% by weight tungsten, or from 2 to 10% by weight nickel and from 10 to 25% by weight molybdenum.

The referenced colorless hydrocarbon polymeric resin is typically characterized by a Gardner color in the region of 1 to 3 down to Saybolt colors of 28+, a softening point in the region of 50° to 150° C., and a bromine number in the region of 1 to 3 or less.

DETAILED DESCRIPTION OF THE INVENTION

This invention is thus concerned with a process for making light-colored to colorless petroleum resins with outstanding adhesive properties. These resins can find a large number of applications, in particular, in adhesive products by pressure. Compared with the terpene resins that are commonly used, they have better adhesive properties, a better color and better aging properties.

According to this invention, such resins are prepared by a process which comprises the distillation of steam cracked naphtha, thermal polymerization of a distilled fraction of this naphtha, partial catalytic hydrogenation of the polymeric resin obtained followed by separation of the solvent and recovery of the finished resin which may include steam distillation wherein the catalytic hydrogenation is achieved by a novel sulfided nickel-tungsten or nickel-molybdenum containing catalyst having an alumina support of uniquely large surface area.

The thermal polymerization of this fraction is carried out in an oxygen-free atmosphere, usually at a temperature from 160° to 320° C., e.g., at about 250° C., at a pressure of 10 to 12 atmospheres, e.g., at 10 atmospheres, for a period of from 0.5 to 9 hours, typically 1½ to 4 hours. This polymerization operation may be batch, semi-batch or continuous.

The produced polymeric resin is dissolved in an inert, predominately saturated hydrocarbon solvent, such as varsol or base white spirits in proportions varying from 10 to 60% and preferably in the region of 20% by weight in relation to the polymer. It is then subjected to partial hydrogenation under the conditions described below whereby the color is reduced to a Gardner No. of 1 to 3 or less, if desired, to a water-white color of Saybolt 28+.

Hydrogenation can take place in an autoclave or a fixed bed reactor at a temperature of 200° to 320° C. at a pressure of 20 to 300 atmospheres and for preference at a hydrogen partial pressure of at least 30 to 50 atmospheres for a period of ½ hour to 3 hours and typically about one hour. The hydrogenation is usefully carried out by means of a fixed catalyst bed with the feed flow being either upflow or downflow liquid phase or trickle bed operation.

The typical hydrogenation/decolorization conditions specified above are one example of those practiced commercially, but should not be considered restrictive. As hydrogen partial pressure and total pressure are increased, one would except the values of the other process variables to change, finished resin color being constant. For example, temperatures might be lowered, or feed resins concentrations increased, or reactor space velocity may be increased. Alternatively, pressure and/or temperature may be increased as a means of reducing finished resin color and/or residual unsaturation as measured by bromine number or bromine index. It has been found that pressures in excess of 120 atmospheres, as taught in UK Specification No. 1,202,802 are required for substantial reduction in residual resin unsaturation and/or heat stability.

After hydrotreating, the mixture from the reactor may be flashed and further separated to recover the solvent and hydrogen for recycle and to recover the hydrogenated resin. The solution is flashed and/or distilled in an oxygen free or minimum oxygen atmosphere to eliminate the solvent, and thereafter, may be steam distilled to eliminate the possible light oily polymers of low molecular weight, known in the trade by the name of "fill", preferably taking care not to raise the temperature of resin above 325° C. to avoid degrading the color and other properties of the finished resin.

The liquid polymeric resin is cast and crushed after cooling. Alternately, it may be pastillated, prilled or flaked.

Resins are thus obtained having a Gardner color in the region of 1 to 3 down to a Saybolt color of 28+, a bromine number in the region of 3 or less, a ball-ring softening point of about 50° to 150° C. and a high degree of tackiness. These properties, together with others such as brilliance, compatibility with other resins, and solubility in usual solvents, enable them to be used in making many products used by the most varied industries: adhesives of all kinds, varnishes and paints, and for the treatment of cellulose materials.

The process of the invention utilizes an adaptation of a hydrodesulphurization catalyst in which nickel and/or cobalt and either molybdenum or tungsten are impregnated as their respective oxides onto an alumina support, preferably of high surface area alumina, e.g., alpha alumina or alumina spinel, e.g., nickel spinel having the requisite pore size distribution. The preferred components are nickel and tungsten on a gamma alumina support. The concentration of metals on the catalyst is critical for good performance and ranges from 2 to 10, preferably 4 to 5, weight percent nickel and from 10 to 25, preferably 16 to 20, weight percent tungsten.

The pore size distribution of the alumina support is also critical to the performance of the catalyst. The catalyst is so prepared that the pore volume of the small pores in the 15–300 Angstrom radius range is less than 70% of the total volume whereas the large pores or channels having radii in the range of 10,000 Å and 75,000 Å are at least 10% of the total pore volume between 10 Å and 75,000 Å. This results in a fresh catalyst surface area of the support typically in the range 120–300 m$^2$/g. In addition, these extensive large pores give rise to a catalyst with sufficient mechanical strength for the commercial operation. In adhering to these criteria for pore size distribution and metals loading a high performance and optimum catalyst for the process of the invention is realized. The catalyst support may contain silica up to a concentration wherein the catalytic surface activity is not markedly affected.

The data in Table I is illustrative of the properties of the novel partial hydrogenation/decolorization catalysts of the invention.

TABLE I

|  | Preferred Range | | Produced Catalysts | | |
|---|---|---|---|---|---|
|  | Minimum | Maximum | A | B | C |
| Loss on ignition (at 600° C.) wt. % | — | 3.0 | — | 0.37 | 0.5 |
| Chemical Analyses, wt. % | | | | | |
| Basis: Finished Catalyst Dried 3 Hours at 1,000° F. | | | | | |
| WO$_3$ | 18.0 | 22.7 | 21.3 | 19.6 | 20.2 |
| NiO | 3.5 | 6.0 | 4.8 | 5.4 | 5.6 |
| SiO$_2$ | — | 2.0 | 0.1 | 0.27 | 0.3 |
| Na$_2$O | — | 0.2 | 0.73 | 0.04 | 0.03 |
| SO$_4$ | — | 2.0 | 2.6 | 0.75 | 1.1 |
| Fe$_2$O$_3$ | — | 0.1 | 0.03 | 0.01 | 0.08 |
| α-Alumina | balance | balance | balance | balance | balance |
| Physical Properties | | | | | |
| Total Surface Area, m$^2$/g[4] | 160 | 240 | 224 | 201 | 181 |
| Average Pellet Diameter, inches[3] | 0.055 | 0.07 | 5/64 | 0.065 | 0.067 |
| Average Length, inches[3] | 0.125 | 0.250 | 0.195 | 0.204 | 0.20 |
| Average Crushing Strength, lbs/118" anvil length[1] | 6.5 | 12 | 7.1 | 11.6 | 8.4 |
| Abrasion Loss. % per ½ hour | — | 7.0 | 3.1 | 2.2 | 5.0 |
| Pore Volume, cc/g, 15–75,000 Å Radius[5] | 0.44 | 0.69 | 0.48 | 0.52 | 0.57 |
| Pore Size Distribution[2] | | | | | |
|   0–100 Å Radius cc/g | 0.30 | 0.45 | 0.33 | 0.37 | 0.36 |
|   100–1,000 Å Radius cc/g | 0.04 | 0.13 | 0.08 | 0.09 | 0.09 |
|   1,000–10,000 Å Radius cc/g | 0.03 | 0.08 | 0.13/0.11 | 0.04 | 0.06 |
|   10,000–75,000 Å Radius cc/g | 0.02 | 0.07 | 0.03 | 0.006/0.014 | 0.06 |
| Total Pore Volume Å cc/g | | | | | |
|   1,000–75,000 Å Radius cc/g | 0.44 | 0.69 | 0.56 | 0.50 | |

TABLE I-continued

|  | Preferred Range | | Produced Catalysts | | |
|---|---|---|---|---|---|
|  | Minimum | Maximum | A | B | C |
| Percent through 16 Mesh, wt. % | — | 0.6 | | | |

[1] Number average using 25 randomly selected extrudates - calcined prior to the crush test at 850° F. for one hour.
[2] 0-300 Å Radius by nitrogen absorption. 300-75,000 Å Radius by mercury porosimeter. Use 140° for mercury contact angle and 474 dynes/cm as the surface tension of mercury.
[3] Number average using 100+ extrudates.
[4] Determined by BET method using nitrogen as adsorbate.
[5] By summation of (a) the pore volume for pores of 15-300 Å radius by nitrogen adsorption and (b) the pore volume for pores of 300-76,000 Å radius by mercury porosimetry.

The following examples illustrate more clearly the process and resin of the present invention. However, these illustrations are not to be interpreted as specific limitations on this invention.

EXAMPLE 1

The production of the hydrogenated resins of this invention is typically done as follows:

A thermal polymeric resin, is diluted with a suitable solvent such as varsol, preferably to the level of 21% resin or less. This solution serves as the feedstock for the resins hydrogenation process. Advantages are claimed in terms of extended catalyst life when aromatics are present in the solvent. Aromatic contents of 8-25% have been successfully used in the pilot and commercial plants. While higher and lower resin feed concentrations have been successfully employed, there appears to be an advantage in terms of run length to limiting resins feed concentration to 21% of a thermal resin with softening point below 100° C. when the hydrogen partial pressure is typically 40-60 bars. Resin concentration in the feed, as well as space velocity, can be increased as the hydrogen partial pressure is increased to produce a resin of constant properties. On the other hand, hydrogen partial pressure can be increased as a means of obtaining even greater catalyst life, lower color and/or reduced residual resin unsaturation.

The term "preactivated" used in this application refers to but is not limited to protractment of the catalyst within the process unit itself. This can be done by:
  wetting the catalyst with the same solvent used to dilute the resin to be hydrogenated;
  increasing reaction pressure to approximately 20 atmospheres and commence feeding hydrogen (at 200 gas ratio) and a solution of 1.8 wt. % $CS_2$ in solvent at a feed rate of approximately 1 Liquid Hourly Space Velocity (herein referred to as LHSV);
  increasing temperature of 200° C. over a 2 hour period and after another 2 hours increasing it to 310° C. and holding these conditions for sufficient time to allow 4 to 8 theoretical equivalents of sulfur to pass over the catalyst;
  delete the $CS_2$, lower the temperature to about 200° C. and condition the catalyst for about 24 hours;
  raising the pressure to approximately 40 atmospheres;
  introducing the polymeric resin feed into the catalyst at approximately 210° C. at a 13.5% resin concentration (higher values may be used), 40 bars pressure, a rate of 1.0 LHSV and a gas ratio of 200; and the reaction is allowed to proceed until the desired product color cannot be met, at which time, the catalyst may be rejuvenated by a hot solvent wash and hydrogen treatment or alternatively the catalyst may be replaced with fresh catalyst.

When there is evidence that the catalyst has stabilized, the resin concentration may be increased from 13.5 to 20-21%, other conditions being constant. Temperature may be increased to produce the desired color of the resin being hydrogenated. At catalyst equilibrium, reactor temperatures will exhibit a gradient typically in the range of 235°-290° C.

EXAMPLE 2

The feedstock was a freshly made up solution of a commercially thermally polymerized steam cracked naphtha fraction diluted to 20 wt. % resin with varsol. Activation of each catalyst was according to the procedure of Example 1.

This Example illustrates the teachings of this invention, specifically in relation of the importance of pore size distribution on catalyst performance.

Table II presents the fresh catalyst inspections. With the exception of Catalyst F, all catalysts of this Example were produced from the same raw materials stock and differ basically only in pore size distribution and consequently also in mechanical strengths. Note that Catalyst F has a significant pore volume in the range 10,000-75,000 Å radius.

The catalysts were run in three cycles of tests to determine their relative performance as follows:
  a. Catalyst activation with hydrogen/varsol/$CS_2$.
  b. Start up and stabilization of the catalysts on resin feed.
  c. Setting a base line performance of LHSV=1.0.
  d. Determination of performance at LHSV=1.6 with no change in feed preheater temperature.
  e. Determination of performance at LHSV=1.6 with increased feed preheater temperature.
  f. Recheck of base line performance of LHSV=1.0.

TABLE III

CHEMICAL AND PHYSICAL ANALYSES OF CATALYSTS

| Catalyst | A | B | C | D | E | F |
|---|---|---|---|---|---|---|
| $WO_3$ wt. % db | 21.2 | 20.8 | 19.0 | 18.9 | 19.2 | 21.3 |
| NiO wt. % | 5.2 | 5.1 | 5.0 | 4.9 | 5.3 | 4.8 |
| $SiO_2$ wt. % db | 0.69 | 1.13 | | | | 0.1 |
| NaO wt. % db | 0.06 | 0.06 | | | | 0.7 |
| $SO_4$ wt. % db | 1.0 | 1.0 | | | | 2.6 |
| Fe wt. % db | 0.02 | 0.02 | | | | 0.02 |
| Surface area, m²/g | 285 | 266 | 219 | 242 | 236 | 224 |
| Pore volume, total, cc/g | 0.55 | 0.61 | 0.61 | 0.61 | 0.61 | 0.65 |

TABLE III-continued

CHEMICAL AND PHYSICAL ANALYSES OF CATALYSTS

| Catalyst | A | B | C | D | E | F |
|---|---|---|---|---|---|---|
| PV less 100 Å radius, cc/g | 0.404 | 0.375 | 0.416 | 0.399 | 0.347 | 0.325 |
| PV 100–1,000 Å radius, cc/g | 0.075 | 0.047 | 0.051 | 0.061 | 0.065 | 0.180 |
| PV 1,000–10,000, Å radius, cc/g | 0.067 | 0.175 | 0.134 | 0.14 | 0.198 | 0.185 |
| PV larger than 10,000 Å radius, cc/g | 0.004 | 0.013 | 0.009 | 0.01 | 0.000 | 0.060 |
| Average diameter, mm | 1.6 | 1.6 | 1.6 | 1.6 | 1.6 | 2.0 |
| Average length, mm | 3.5 | 3.5 | | | | |
| Average side crush strength, lbs/⅛ inch | 11.1 | 4.8 | 8.6 | 7.6 | 6.4 | 6.8 |
| Abrasion resistance, % | 0.4 | 3.4 | 1.0 | 1.1 | 2.0 | 9.0 |
| Reactor density, g/cc | 0.72 | 0.66 | 0.76 | 0.67 | 0.63 | 0.64 |
| Compacted bulk density, g/cc | 0.76 | 0.70 | | | | 0.67 |

RESULTS

At a LHSV=1.0 the hydrogenation performance of the catalysts decreased in the order—F, E, C, A, D. Note that the catalyst, most closely having the properties of this invention demonstrated the best hydrogenation performance. At the elevated space velocity with increased preheater temperature (more severe conditions) Catalysts F and E again demonstrate the best hydrogenation performance. The decolorization performance of the various catalysts was in the following order of decreasing effectiveness; F, E, C, D, A. The decolorization performance of Catalysts F and E were essentially equivalent at both LHSV=1.0 and 1.67, namely, +30 Saybolt color. At an equivalent time, the colors of the resins from the other catalysts was poorer than +30 Saybolt. Thus, it is seen that the decolorization performance at increased severity improves with increasing the maximum pore radius of the pore size distribution.

EXAMPLE 3

This Example illustrates that when a catalyst of desired pore size distribution is used, improved performance of the resins hydrogenation/decolorization process is achieved. The catalysts referred to below correspond to the catalysts of Table I.

TABLE III

EFFECT OF PORE SIZE DISTRIBUTION ON CATALYST PERFORMANCE

| | Catalyst | | |
|---|---|---|---|
| | A | B | C |
| Finished resin produced, tons | 1,290 | 1,064 | 3,434 |
| Percentage of resin with color of Saybolt 22+ | 60 | 75 | 97 |

These data illustrate that as the target preferred properties of the catalyst are approached, better catalyst performance is achieved in terms of run lengths (total tons of resin produced) as well as improved finished resin color. It is worthy to note that the operation employing Catalyst C was voluntarily terminated and the total tons of finished resin produced should not be considered as limiting for that catalyst.

EXAMPLE 4

The feedstock to the hydrogenation/decolorization process polymerization is a thermal resin derived from a fraction of steam cracked naphtha which had the following characteristics:
  Bromine number—60
  Gardner color—7–8
  Softening point—97° C.

The resin was formed into a 20–21% solution by weight in Varsol NDA and injected into a hydrogenation/decolorization reactor, using a preactivated nickel-tungsten catalyst was previously defined as Catalyst C of Examples 1 and 3.

The operating conditions were:
  reactor space velocity—1.25 volume feed/volume catalyst/hour
  total pressure—55 atmospheres
  hydrogen pressure—40 atmospheres
  maximum reactor temperature—285° C.

At the end of the operation the hydrogenated/decolorized resin dissolved in Varsol NDA was subjected to steam distillation at atmospheric pressure and at 250° C. to remove the solvent and to eliminate lower molecular weight polymers.

The hydrogenated/decolorized resin thus obtained at a yield of 87 wt. % in relation to the original thermal resin had the following characteristics:
  Saybolt color—27–30
  Softening point—150° C.
  Bromine number—3.

The invention in its broader aspect is not limited to the specific details shown and described and departures may be made from such details without departing from the principles of the invention and without sacrificing its chief advantages.

What is claimed is:

1. In a process for making petroleum resins in which a steam cracked petroleum distillate fraction boiling in the range of 20° C. to 280° C. is thermally polymerized, and the polymeric resin so obtained is subjected to catalytic hydrogenation/decolorization, the improvement which consists of the use of a hydrogenation catalyst comprising a sulfided nickel-tungsten catalyst on a gamma alumina support having a fresh catalyst surface area ranging from 120 to 300 m$^2$/g and containing from 2 to 10% by weight nickel and from 10 to 25% by weight tungsten said support having a small pore volume in the 15 Å–300 Å radius range of less than 70% of the total pore volume whereas the large pores or channels having radii in the range of 10,000 Å and 75,000 Å are at least 10% of the total pore volume between 10 Å and 75,000 Å.

2. In a process for making petroleum resins in which a steam cracked petroleum distillate fraction boiling in the range of 20° C. to 280° C. is thermally polymerized, and the resin so obtained is subjected to catalytic hydrogenation/decolorization, the improvement which consists of the use of a hydrogenation catalyst comprising a sulfided nickel-molybdenum catalyst on a gamma alumina support having a fresh catalyst surface area ranging from 120 to 300 m$^2$/g and containing from 2 to 10% by weight nickel and from 10 to 25% by weight molybdenum, said support having a small pore volume in the 15 Å–300 Å radius range of less than 70% of the total pore volume whereas the large pores or channels having radii in the range of 10,000 Å and 75,000 Å are at least 10% of the total pore volume between 10 Å and 75,000 Å.

3. In the process of claim 1 wherein the nickel is in an amount of about 4 wt. % and the tungsten is in an amount of about 16 wt. %.

4. In the process of claim 1 wherein the catalyst support is a high surface area alumina or an alumina spinel.

5. In the process of claim 1 wherein the catalyst support contains silica up to a concentration wherein the catalyst surface acidity is not markedly affected.

6. In the process of claim 1 wherein the thermal resin is dissolved in a solvent and is hydrogenated/decolorized at a temperature of 200° to 320° C. and at a pressure of 20 to 300 atmosphere and at a hydrogen partial pressure of at least 30 to 50 atmospheres for a period of ½ hour to 3 hours.

7. In the process of claim 1 wherein the nickel is present in an amount of about 4 wt. % and the molybdenum is in an amount of about 16 wt. %.

8. In the process of claim 1 wherein the catalyst support is any high surface area alumina or an alumina spinel.

9. In the process of claim 1 wherein the catalyst support contains silica up to a concentration wherein the catalyst surface acidity is not markedly affected.

10. In the process of claim 1 wherein the thermal resin is dissolved in a solvent and is hydrogenated/decolorized at a temperature of 200° to 320° C. and at a pressure of 20 to 300 atmospheres and at a hydrogen partial pressure of at least 30 to 50 atmospheres for a period of ½ hour to 3 hours.

* * * * *